(12) United States Patent
Tseng

(10) Patent No.: US 8,891,832 B2
(45) Date of Patent: Nov. 18, 2014

(54) COMPUTER-VISION-ASSISTED LOCATION CHECK-IN

(75) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 760 days.

(21) Appl. No.: 13/152,576

(22) Filed: Jun. 3, 2011

(65) Prior Publication Data

US 2012/0308077 A1 Dec. 6, 2012

(51) Int. Cl.
*G06K 9/00* (2006.01)
*G06Q 50/00* (2012.01)

(52) U.S. Cl.
CPC .................................. *G06Q 50/01* (2013.01)
USPC ........................ 382/118; 382/305; 382/321

(58) Field of Classification Search
USPC .......................................... 382/118, 305, 321
See application file for complete search history.

(56) References Cited

U.S. PATENT DOCUMENTS

| | | | |
|---|---|---|---|
| 6,819,356 B1* | 11/2004 | Yumoto ...................... 348/231.2 |
| 7,007,243 B2* | 2/2006 | Baldino ........................ 715/853 |
| 7,872,669 B2* | 1/2011 | Darrell et al. .............. 348/207.1 |
| 7,978,232 B1* | 7/2011 | Khan ........................ 348/231.3 |
| 8,031,238 B2* | 10/2011 | Uchiyama et al. ......... 348/231.3 |
| 8,131,118 B1* | 3/2012 | Jing et al. ...................... 382/305 |
| 8,144,920 B2* | 3/2012 | Kansal et al. ................. 382/100 |
| 8,290,999 B2* | 10/2012 | Shepherd et al. ............. 707/728 |
| 8,400,525 B2* | 3/2013 | Watazawa ................... 348/231.3 |
| 8,509,488 B1* | 8/2013 | Enge et al. ..................... 382/106 |
| 8,649,572 B2* | 2/2014 | Gokturk et al. ............... 382/118 |
| 8,670,597 B2* | 3/2014 | Petrou et al. .................. 382/116 |
| 2006/0179451 A1* | 8/2006 | Sung ............................... 725/12 |
| 2007/0244634 A1* | 10/2007 | Koch et al. .................... 701/207 |
| 2007/0268392 A1* | 11/2007 | Paalasmaa et al. ...... 348/333.02 |
| 2008/0147730 A1 | 6/2008 | Lee |
| 2010/0046842 A1* | 2/2010 | Conwell ....................... 382/218 |
| 2010/0198940 A1 | 8/2010 | Anderson |
| 2011/0038512 A1* | 2/2011 | Petrou et al. .................. 382/118 |
| 2011/0043643 A1* | 2/2011 | Yu et al. ..................... 348/207.1 |
| 2011/0128288 A1* | 6/2011 | Petrou et al. .................. 345/428 |
| 2011/0225553 A1* | 9/2011 | Abramson et al. ............ 715/863 |

OTHER PUBLICATIONS

International Search Report and Written Opinion for International Application No. PCT/US2012/040143, Jan. 2, 2013.

* cited by examiner

*Primary Examiner* — Jayesh A Patel
(74) *Attorney, Agent, or Firm* — Baker Botts L.L.P.

(57) ABSTRACT

In one embodiment, an uploaded multimedia object comprising a photo image or video is subjected to computer vision algorithms to detect and isolate objects within the multimedia object, and the isolated object is searched against a photographic location database containing images of a plurality of locations. Upon detecting a matching object, the location information associated with the photograph in the database containing the matching object may be leveraged to automatically check the user in to the associated location.

20 Claims, 7 Drawing Sheets

COMPUTER-VISION-ASSISTED LOCATION CHECK-IN

TECHNICAL FIELD

The present disclosure relates generally to geo-social networking, and more particularly, applying computer vision algorithms to user-uploaded multimedia objects to search a photographic location database for photographs containing similar object images in order to ascertain the physical location at which the multimedia object was captured.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs). Conventional approaches to enable sharing of user-generated content include various information sharing technologies or platforms such as social networking websites. Such websites may include, be linked with, or provide a platform for applications enabling users to view "profile" pages created or customized by other users where visibility and interaction with such profiles by other users is governed by some characteristic set of rules. By way of example, a user profile may include such user-declared information as contact information, background information, job/career information, as well as interests.

A traditional social network is a social structure made of individuals, groups, entities, or organizations generally referred to as "nodes," which are tied (connected) by one or more specific types of interdependency. Social network (graph) analysis views social relationships in terms of network theory consisting of nodes and edges. Nodes are the individual actors within the networks, and edges are the relationships between the actors. The resulting graph-based structures are often very complex. There can be many kinds of edges between nodes. In its simplest form, a social network, or social graph, is a map of all of the relevant edges between all the nodes being studied.

Users may interact with other non-user nodes and explicitly express an affinity for the node through various actions. Users may also interact with physical entities, such as businesses or particular locations that may or may not be represented by a corresponding node in the social graph.

Social networking systems may include geo-social aspects in which geographic services and capabilities are used to enable additional social interactions. User-submitted location data or geo-location techniques such as mobile phone position tracking may enable a geo-social network to connect and coordinate users with local users, events, and places that match their interests.

DESCRIPTION OF EXAMPLE EMBODIMENTS

Figure 1:
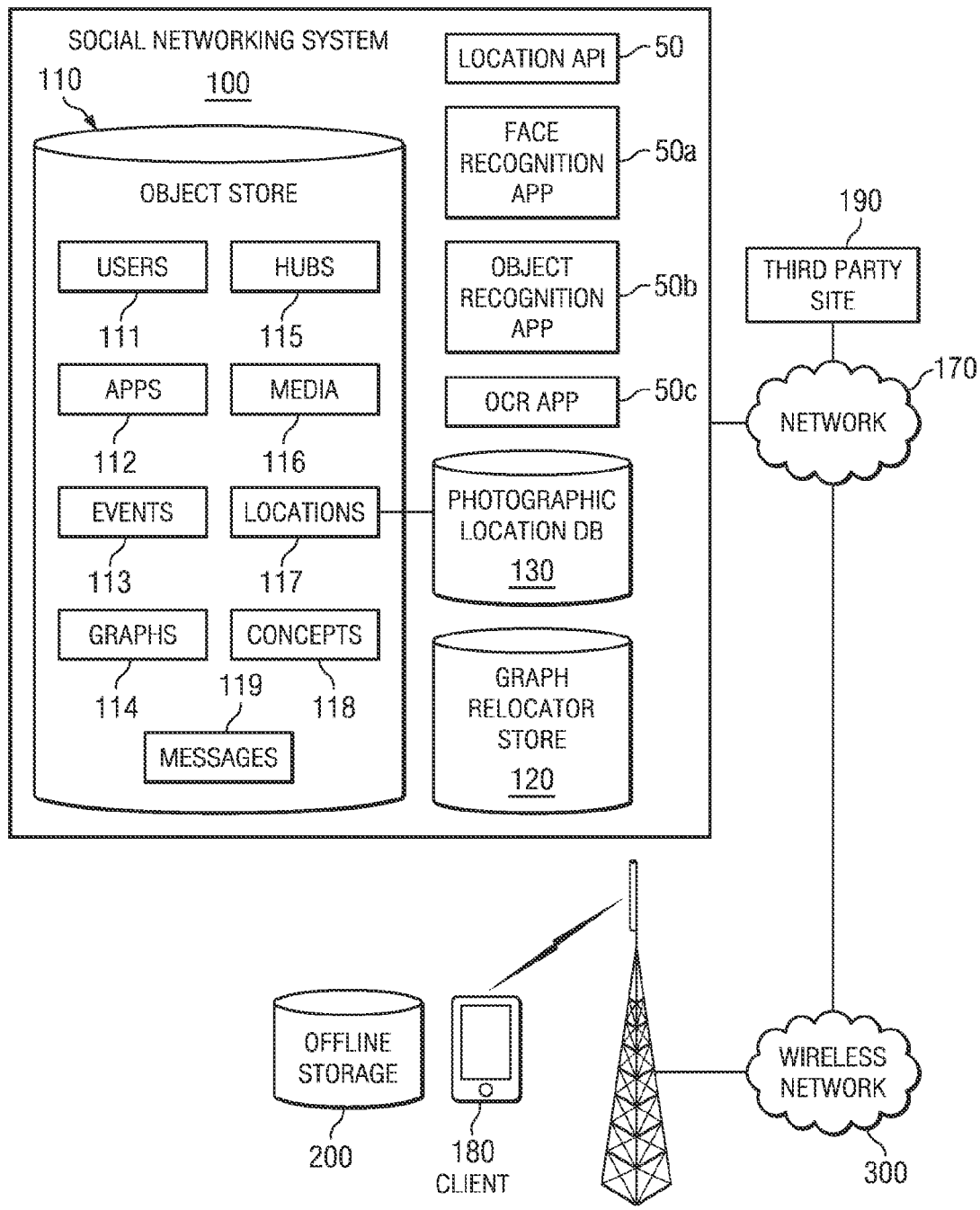
FIG. 1 illustrates an example computer network environment of an example social network environment.

Particular embodiments relate to a social network environment that includes an infrastructure or platform (hereinafter infrastructure and platform may be used interchangeably) enabling an integrated social network environment. In the present disclosure, the social network environment may be described in terms of a social graph including social graph information. In particular embodiments, one or more computing systems of the social network environment implementing the social network environment include, store, or have access to a data structure that includes social graph information for use in implementing the social network environment described herein. The social network utilizes a social graph that includes nodes representing users and concepts in the social network environment as well as edges that define or represent connections between such nodes.

In particular embodiments, the social graph information includes a first set of user nodes that each correspond to a respective user, and a second set of concept nodes that each correspond to a respective concept. As used herein, a "user" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment.

By way of example, a user node may have a corresponding user profile page in which the corresponding user can add content, make declarations, and otherwise express him or herself, while a concept node may have a corresponding concept profile page ("hub") in which a plurality of users can add content, make declarations, and express themselves, particularly in relation to the concept. In particular embodiments, the social graph information further includes a plurality of edges that each define or represent a connection between a corresponding pair of nodes in the social graph.

Users of the social networking system may interact with concept nodes and their hubs in various ways. For example, a user may click a button on the hub explicitly stating that the user "likes" the hub and associated concept node. In particular embodiments, a user may "check-in" to a real-world location that is associated with a hub page. Checking-into a real world location associated with a concept node may be a relatively complex process. A user of a mobile device must first access a "check-in" function, and search for concept nodes by name. Location-based algorithms that filter down the list of possible concept nodes to those within the geographic region of the user may expedite the process, but generally the user must still type in the name of the location, select the associated concept node from a list of nearby concept nodes, and "check in." In particular embodiments, a user may append free-form text, audio, video, or a photograph to the check-in.

In particular embodiments, the social networking system maintains a photographic location database of various locations and objects. In particular embodiments, the images in the photographic location database are generated by the social network itself. In particular embodiments, the images are submitted by administrators of concept nodes, such as business owners. A particular business owner may submit a photo image of his or her storefront, for example. In particular embodiments, the social networking system builds the photographic location database by accepting images from users. For example, if multiple users submit a photograph of the Wynn casino in association with a check-in to the Wynn casino concept node, the social network associates the photos submitted with the concept node in the photographic location database. In particular embodiments, the social network builds the photographic location database based upon the location of submitted photos. For example, if a user uploads a photo within a predetermined time of capture, the social network knows that the user was at a particular location (from GPS or cellular data), and may infer that the photo is of the object or location associated with the particular location. In particular embodiments, the photographic location database is provided by a third-party such as Garmin, Mapquest, or Google StreetView. This disclosure contemplates any method of generating or obtaining the photographic location database.

In particular embodiments, photographs uploaded to the social networking system are subject to an object image recognition algorithm. The object image recognition algorithm compares the uploaded image to the images stored in the photographic location database and searches for similar objects in the photographic location database. Objects may be certain elements of the landscape, buildings, landmarks, or a particular arrangement of various photo elements. Methods for object searching are well-known in the art, and may include frequency-domain image processing, filtering, wavelet analysis, feature extraction, learning-algorithms such as neural networks, texture recognition, and the like. This disclosure contemplates any type of computer vision algorithms for finding matching objects. In particular embodiments, users uploading photos to the social networking system may tag particular regions of the photo containing people or objects of interest. In particular embodiments, this information may be used to exclude people from the object image recognition algorithm, or to include regions that may correspond to geographical objects such as buildings, landmarks, etc. that specific object image recognition algorithms, such as feature extraction algorithms, may key in on.

In particular embodiments, the object image recognition algorithm automatically recognizes signs as a particular class of object, and applies optical character recognition (OCR) to convert photographed signs into searchable text. In particular embodiments, the photographic location database includes extracted text for each photo including a sign. In particular embodiments, the text from the uploaded photo is searched against the text stored in association with each photo having a sign in the photographic location database.

This disclosure envisions various optimizations of the object image recognition algorithm. In particular embodiments, the object image recognition algorithm may narrow the images searched and compared based upon location information from the user uploading the photo. For example, if the user's location has been determined to be in Las Vegas (either from GPS, cellular triangulation, check-in, or being checked in by another user), within a predetermined period of time, the object image recognition algorithm may limit the images searched to only the images associated with Las Vegas, Nev. In a particular embodiments, the object image recognition algorithm first attempts to match text from the uploaded photo extracted by OCR to the text-searchable database before searching via the object image recognition algorithm due to the relative speed at which text is searched compared to image searching. In particular embodiments, the set of images searched by the object image recognition algorithm is narrowed by the text search.

In particular embodiments, after matching one or more objects in the uploaded image to objects contained in images in the photographic location database, the social networking system determines a location of the user based on location data stored in association with the matched images in photographic location database. In particular embodiments, the location is expressed in terms of a specific longitude and latitude coordinate pair. In particular embodiments, the location is expressed as a long/lat coordinate pair and a radius covering a predetermined circular area in which the user may be in. In particular embodiments, the location information includes a direction. For example, if a user takes a picture of the John Hancock building and Lake Michigan is in the background, the object image recognition algorithm may recognize both the John Hancock building as well as a body of water. The social networking system may then determine that the only view of the John Hancock including water is toward the East facing Lake Michigan. In particular embodiments, the directionality value may be a vector or a series of vectors.

After obtaining location information, the social networking system may take one or more actions on the photo or the user account associated with the uploaded image. In particular embodiments, the social networking system may automatically check the uploading user into the determined location. For example, if a user takes and uploads a picture of the Empire State Building, the user will automatically be checked into "Empire State Building, New York, N.Y.", and this story will be displayed on the user's profile page on the social network. In particular embodiments, the social networking system also applies a face recognition algorithm, so that the user as well as any users whose faces are detected in the uploaded photo are checked into the location as well. In particular embodiments, the social networking system may tag the uploaded photos with the names of the users whose faces are detected by the face recognition algorithm. In particular embodiments, the object itself may also be tagged as a result of the object image recognition algorithm. For example, if a photo includes the Statue of Liberty, the social networking system may tag the object in the photo with the meta data "Statute of Liberty."

In particular embodiments, the determined location can be used to augment or otherwise correct a location determination made by the user's device. For example, feature phones lacking a dedicated global positioning system (GPS) receiver may obtain a more accurate location fix from the location determined by the social networking system. Even phones with assisted-GPS (aGPS) may benefit from position data determined by the social networking system in areas where GPS signals are subject to obstruction and interference, such as areas with a large number of high buildings. This "urban canyon" problem can result in grossly inaccurate position determination from GPS devices, and may be corrected via the location determined by the social network from analysis of the uploaded image. In particular embodiments, the social networking system may leverage metadata contained in the uploaded photo, such as exchangeable image file format (EXIF) data, to assist location determination. For example, the uploaded photo may include geotagging information such as EXIF tags indicating the location where the image was captured. Mobile devices such as mobile phones with global positioning system receivers may also automatically geotag photos captured by the device with EXIF location data. The social networking system may, for each photo including location metadata, narrow the set of images searched by the object image recognition algorithm to photos associated with locations in a predetermined radius around the region indicated by the location metadata. In particular embodiments, the timestamp metadata may be used to narrow or expand the search radius. For example, a photo that was uploaded within minutes of the time of capture may be searched against a smaller search area than a photo that was uploaded hours after the time of capture.

Various portions of such a social networking platform may be implemented via a hardware architecture or software framework that enables various software components or processes to implement particular embodiments, as is described in more detail, by way of example and not by way of limitation, below. The platform may include one or more hardware or software components, one or more of which may be located or embodied in one or more consolidated or distributed computing systems. Additionally, as used herein, "or" may imply "and" as well as "or;" that is, "or" does not necessarily preclude "and," unless explicitly stated or implicitly implied.

FIG. 1 is a high-level block diagram of a social networking system including an image-based location determination system according to one embodiment. FIG. 1 illustrates a social networking system 100, client device 180, wireless cellular network 300, and third-party website 190. It is understood that wireless cellular network 300 represents multiple wireless cellular networks provided by a plurality of carriers. FIG. 1 also includes offline storage 200 that is local to client device 180. Client device 180 is depicted as a mobile phone, but client device 180 may comprise any type of computing device, including mobile phone, laptop, netbook tablet, cable box, television, etc. Client device 180 is any device with both a data connection to network 170 and a camera. Client device 180 need not have a direct connection to network 170 or wireless data network 300. For example, client device 180 may be a digital camera with a Bluetooth connection to a modem. Client device 180 has one or more memories capable of storing captured multimedia objects such as photos, videos, and audio files, depicted in FIG. 1 as offline storage 200.

A user of the client device 180 interacts with the social networking system 100 via an application, such as a web browser or a native application, to perform operations such as browsing content, posting and sending messages, retrieving and sorting messages received from other users, uploading multimedia objects, and the like. Client device 180 may also use an application or browser to pull and view profile information for various user nodes and hubs in social networking system 100.

The social networking system 100 comprises an object store 110, and a graph information store 120. The object store 110 stores information on objects, such as users, represented in or by the social networking environment 100. The graph information store 120 stores information on the relationships of the objects in the object store 110.

Object store 110 includes various storage areas. User store 111 includes profile pages for specific user accounts or members of social networking system 100. Hubs store 115 includes profile or hub pages for concept nodes such as businesses, locations, and celebrities. Apps store 112 includes third-party applications that users may install and run on their profile page. Media store 116 includes uploaded user media such as photos, videos, audio files, and other types of multimedia objects.

Location database 117 stores information regarding physical real-world locations, or places, that may be associated with concept nodes, such as a landmark, business, or popular location. Places correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/763,171. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. As described in more detail below, check-in to a given place may occur when a user is physically located at a place and, using a mobile device, access the geo-social networking system to register the user's presence at the place. As described below, a user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including the comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. The user may also add, delete or update events that the user is associated with. For example, a user may update a social event associated with a time and date that the user is planning to attend, or make comments in his wall-posts about a past event he attended.

Location application program interface (API) interacts with client device 180 to receive photos and other multimedia objects. In particular embodiments, client device 180 may upload photos substantially in real-time and without user action. In particular embodiments, client device 180 only uploads the photo in response to specific user actions. In particular embodiments, client device 180 uploads the photo or multimedia device through wireless network 300. In particular embodiments, client device 180 has a wired or wireless connection, such as a cellular connection or WiFi connection, and uploads the photo or multimedia object directly through network 170. This disclosure contemplates any manner of connectivity from client device 180 to social networking system 100.

Location API 50 may in some embodiments include face recognition application 50a, object recognition application 50b, and OCR application 50c. In particular embodiments, object recognition application may be further broken down into different image processing modules, such as for frequency and wavelet transformation.

Location API accesses photographic location database 130. In particular embodiments, photographic location database 130 may be included in location database 117. In particular embodiments, photographic location database 130 may be logically or physically linked to location database 117. Regardless of the particular implementation, photographic location database 130 contains a collection of photos of various places, landmarks, businesses, and other physical locations, and may include multiple photos for each location or place stored in location database 117. In particular embodiments, photographic location database 130 includes, for each photo, the longitude and latitude coordinates associated with the physical location in the photo. In particular embodiments, each photo in photographic location database 130 includes a direction vector indicating the viewpoint from which the photo was taken. In particular embodiments, searchable text extracted through OCR is stored in association with photo images containing signage or other sources of text. For example, photographic location database 130 may store the text "Hollywood" in a searchable format in association with a photo of the famous "HOLLYWOOD" sign in Los Angeles.

Photographic location database 130 may be updated to keep the photographs current. In particular embodiments, photos and videos received from other users may be utilized to update photographic location database 130. For example, if a photo is submitted in connection with a check-in, location API 50 may add the user uploaded photo by pulling it from media store 116 and the location from location store 117, create a data structure associating the photo and location, and store it in photographic location database 130. In particular embodiments, location API 50 may pull images from third-party sites 190 such as Yelp! or Google StreetView to update photographic location database 130.

Figure 2:
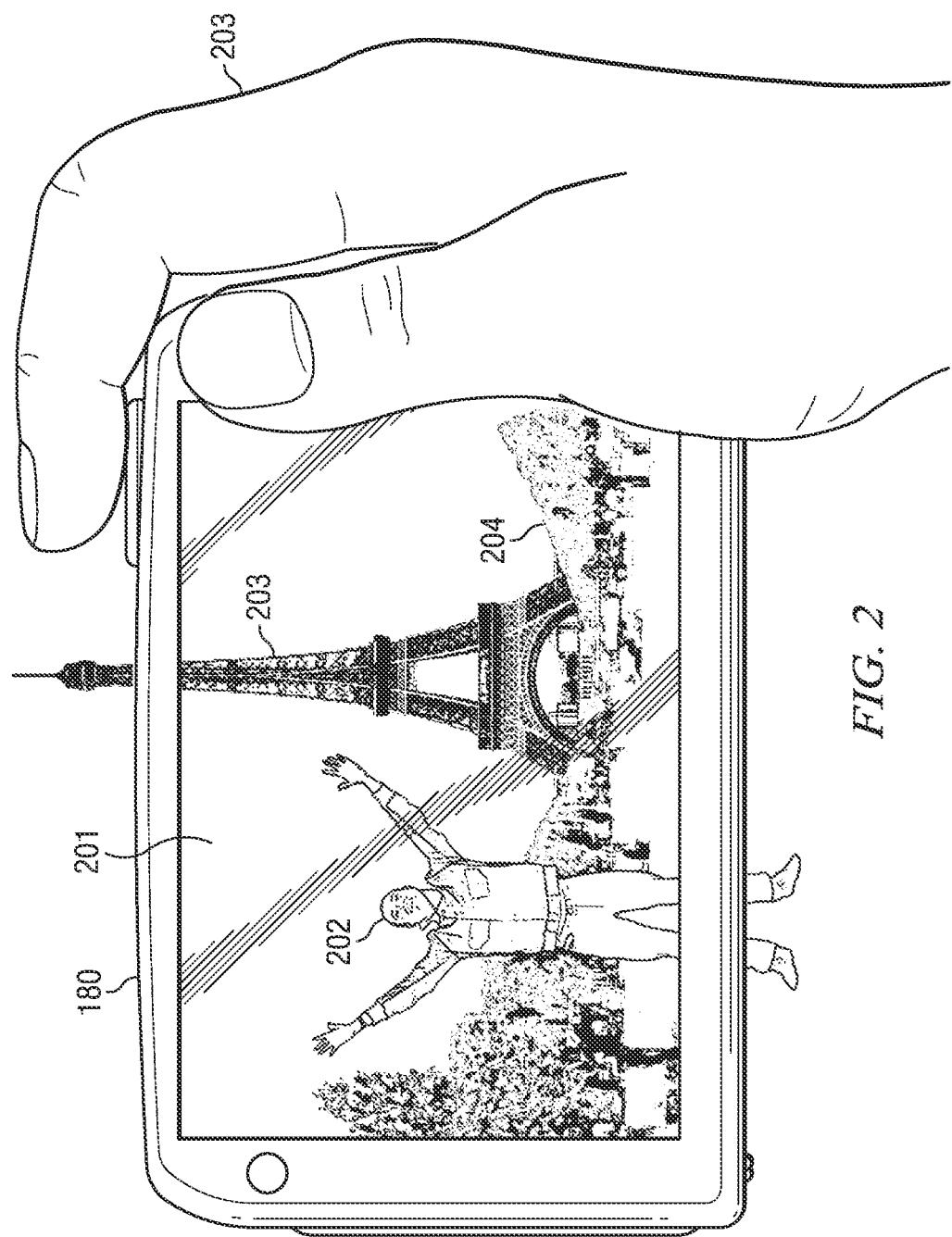
FIG. 2 illustrates an example of a user taking a photo with a mobile device.

FIG. 2 depicts an example user 203 utilizing a client device 180 to compose a photo image for upload. The scene 201 captured in the photo image includes a person 202, object 203, and objects 204. The object image recognition algorithm treats object 203, the Eiffel Tower, and objects 204, the row of trees near the Eiffel Tower, in substantially the same manner. In particular examples, the "main" object captured in an image may be extremely difficult to recognize and match, whereas the surrounding scenery is more distinctive to computer vision algorithms. However, object 203 and objects 204 mainly differ to location API 50 in that object 203 in this particular example is stored in association with a particular location that may be directly checked-into ("The Eiffel Tower, Paris, France."). Client device 180 in this example is a mobile phone equipped with a camera. Client device 180 may also include its own GPS or aGPS chip, or may be a feature phone lacking GPS hardware and relying on time distance of arrival (TDoA) triangulation to self-determine its position.

Figure 3:
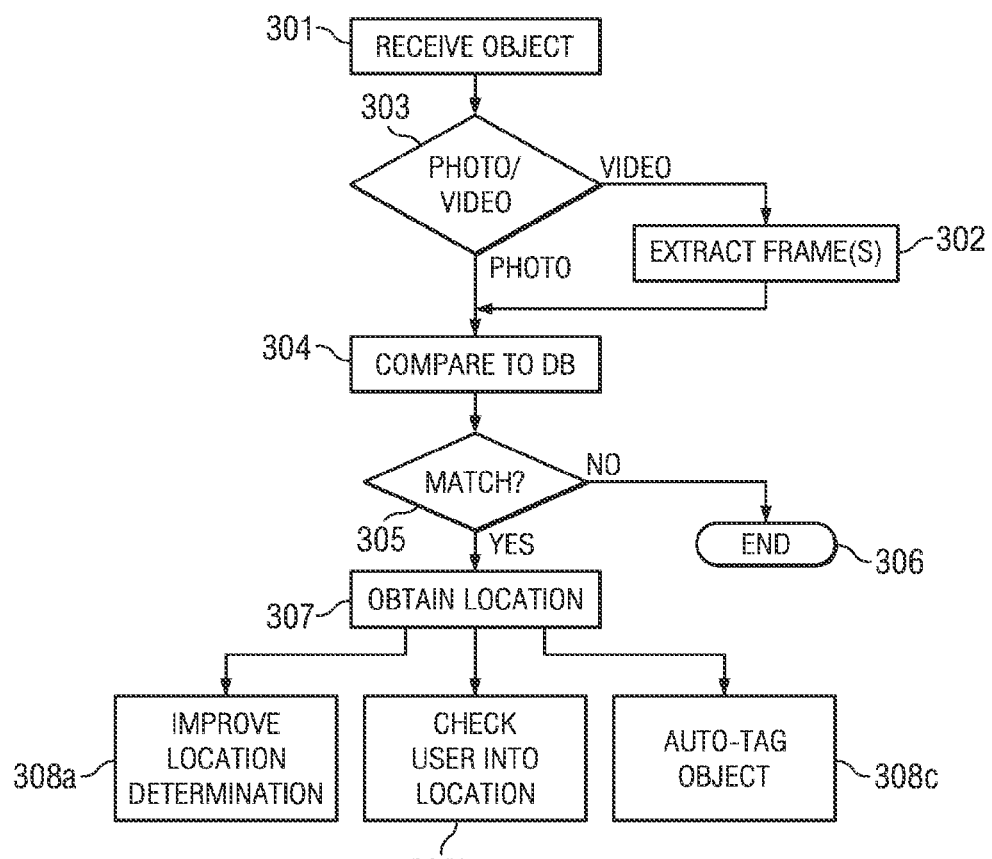
FIG. 3 is a flowchart illustrating an example method for calculating a location from a multimedia object.

FIG. 3 illustrates an example method of extracting location information from a multimedia object. At Step 301, one or more servers of social networking system 100 running location API 50 receives a multimedia object. The multimedia object may be uploaded from client device 180 through any type of packet data connection. In particular embodiments, the multimedia object is uploaded substantially in real-time automatically through the wireless data connection of client device 180. In particular embodiments, the multimedia object is uploaded in response to user inputs to client device 180. In particular embodiments, the multimedia object is uploaded in connection with a check-in. Regardless of when or how the multimedia object is uploaded, the method proceeds to step 302, where location API 50 determines whether the uploaded multimedia object is a photo or video.

If location API 50 determines that the uploaded multimedia object is a video, the method proceeds to Step 302. In Step 302, location API 50 extracts one or more individual frames from the video file. Location API 50 may extract frames from a video file in any manner. For example, in particular embodiments, location API 50 may select the first frame. In particular embodiments, location API may select the frame or frames which have the greatest similarity to other frames. In particular embodiments, location API 50 may select frames at predetermined intervals. This disclosure contemplates any manner of selecting and extracting frames from a video file.

After extracting one or more frames for comparison from the video file, or if the multimedia object is a single photographic image, the method proceeds to Step 304. At Step 304, location API 50 compares the uploaded photo or extracted frames to photographs in photographic location database 130. In particular embodiments, this process is carried out through specialized object recognition application 50b. In particular embodiments, this step is carried out by location API 50. In particular embodiments, one or more software modules for comparing textures, edges, smooth objects, and the like carry out Step 304. In particular embodiments, location API 50 performs frequency-domain image processing or texture recognition to match a particular object in the uploaded photo to an object in one of the photographs in photographic location database 130. In particular embodiments, location API 50 uses graph similarity functions to perform the image matching. In particular embodiments, location API 50 creates object representations based on two-dimensional shape primitives for each object in the uploaded photo, and compares the primitives to primitives stored in association with each photo in photographic location database 130. In particular embodiments, location API 50 creates a transformed image from the uploaded photo using wavelet transforms, and compares the image to wavelet transforms of images stored in photographic location database 130. In particular embodiments, location API 50 utilizes a neural network to classify objects in the uploaded image. Methods of image matching and image object recognition are well-known in the art, and this disclosure contemplates any suitable method for matching objects in the uploaded image with objects contained in the images stored in photographic location database 130.

Comparison Step 304 may include extracting text from the uploaded image or extracted frames. Location API 50 may include optical character recognition application 50c or other software modules that, alone or in conjunction, may locate blocks of text, perform OCR on the blocks of text, and extract searchable text from the OCR process. For example, famous signage or the name of a restaurant may be extracted from a photograph. Because of the relative speed at which text may be searched versus images, in particular embodiments, location API 50 first narrows the set of images in photographic location database 130 to be compared with the uploaded image to only those stored with extracted text matching a portion of the text extracted from the uploaded image.

Comparison Step 304 may include a number of performance optimizations to enhance the speed at which location API 50 may find a matching object image. For example, if the uploaded image includes any amount of location data, regardless of how coarse, location API 50 may narrow the search of images in photographic location database 130 to images associated within a predetermined vicinity to the location data. For example, if client device 180 is a mobile phone, the uploaded image may include location data such as a determined position through GPS or TDOA, or the cell site that client device 180 is connected to. Location API 50 may accordingly narrow the set of images in photographic location database 130 to be compared to the uploaded image. For example, location API may match the detected object in scene 201 to the Eiffel tower replica at the Paris casino in Las Vegas. However, even the coarsest of location augmentation obtained from client device 180 would prevent this erroneous location determination. Location API 50 may, in particular embodiments, use any type of location information obtainable through client device 180, including but not limited to the carrier, cell site number, whether the user is roaming, and the like.

If location API 50 completes the search of all images in photographic location database 130 without a match, the process terminates at Step 306. In particular embodiments, location API 50 may progressively increase the search set until a match is found or every single image in photographic location database 130 is searched. If an object in the uploaded image or extracted frames matches an object contained in an image stored in photographic location database 130, at Step 307, location API 50 obtains the location information stored in association with the matching image. The location information is generally stored as a long/lat coordinate pair. In particular embodiments, the location information also includes a radius value indicating that the photograph was captured somewhere in the vicinity of a particular long/lat coordinate pair. In particular embodiments, the location information also includes a directionality value, indicating that the photograph was captured with the lens facing a particular direction. In particular embodiments, this directionality value may be a single vector or multiple vectors. In particular embodiments, the location information includes an elevation value. This disclosure contemplates any suitable location information stored in association with photographs in photographic location database 130.

Figure 4:
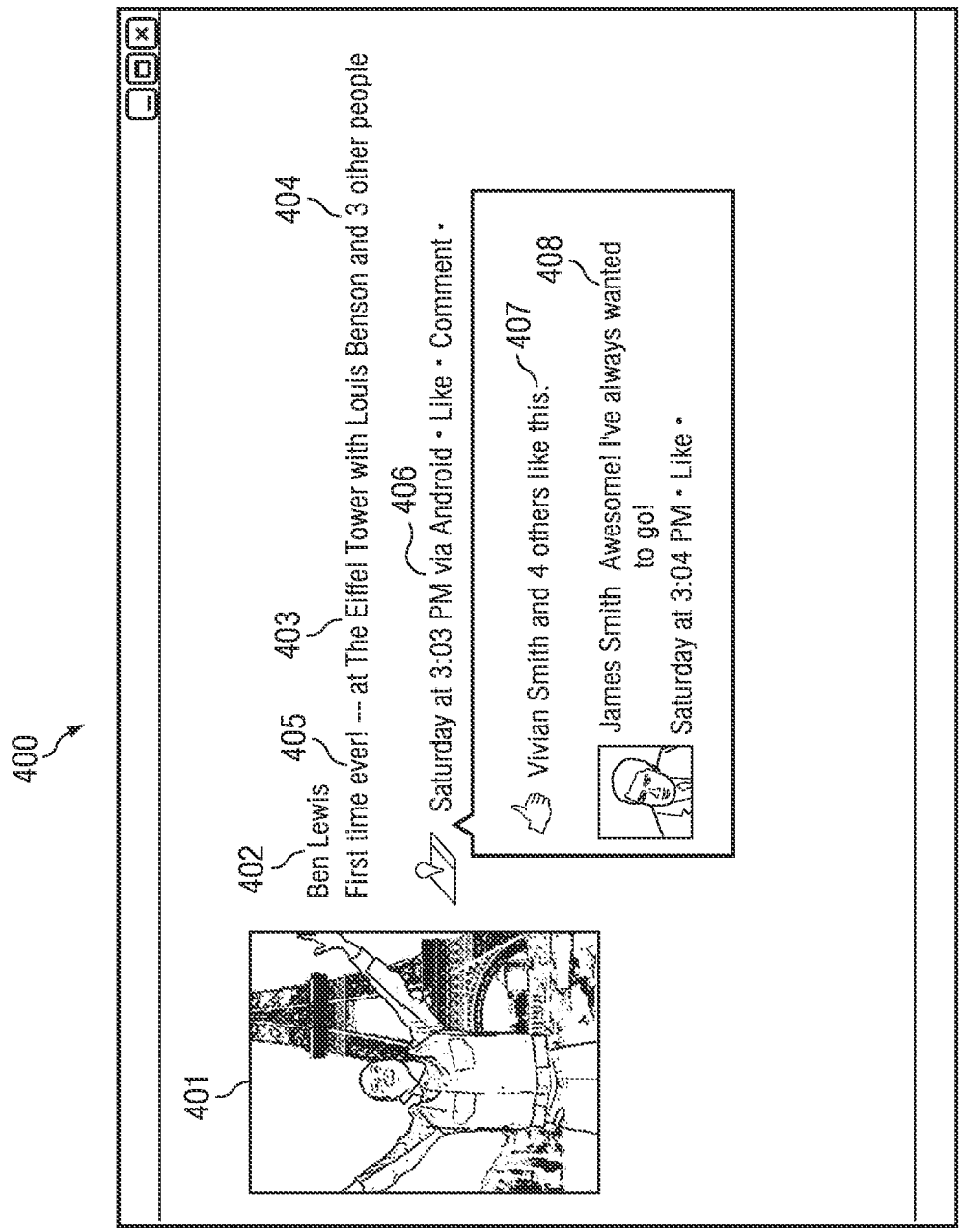
FIG. 4 illustrates an example check-in automatically generated from one embodiment of the invention.
Figure 5:
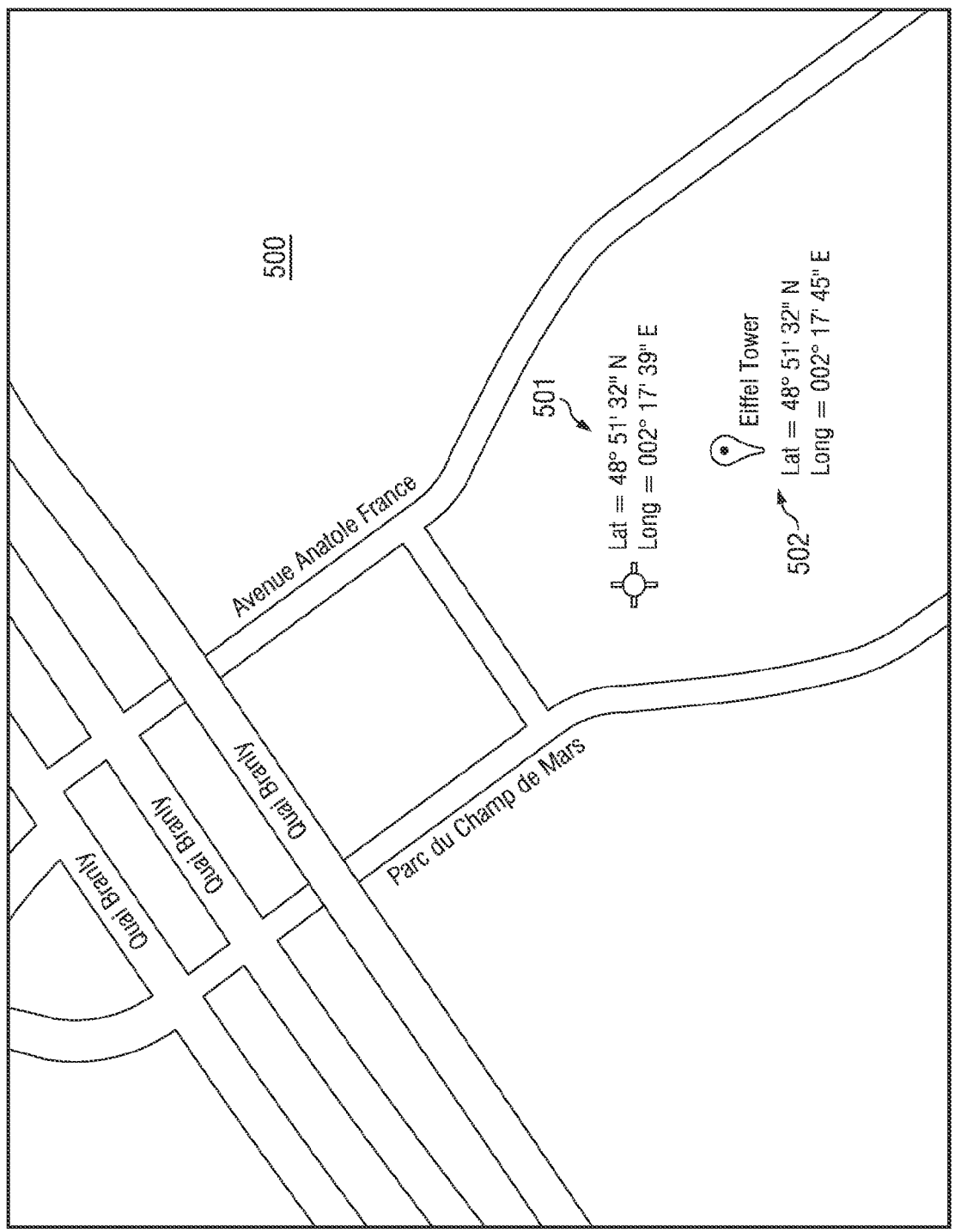
FIG. 5 illustrates an example location accuracy augmentation in accordance with one embodiment of the invention.
Figure 5A:
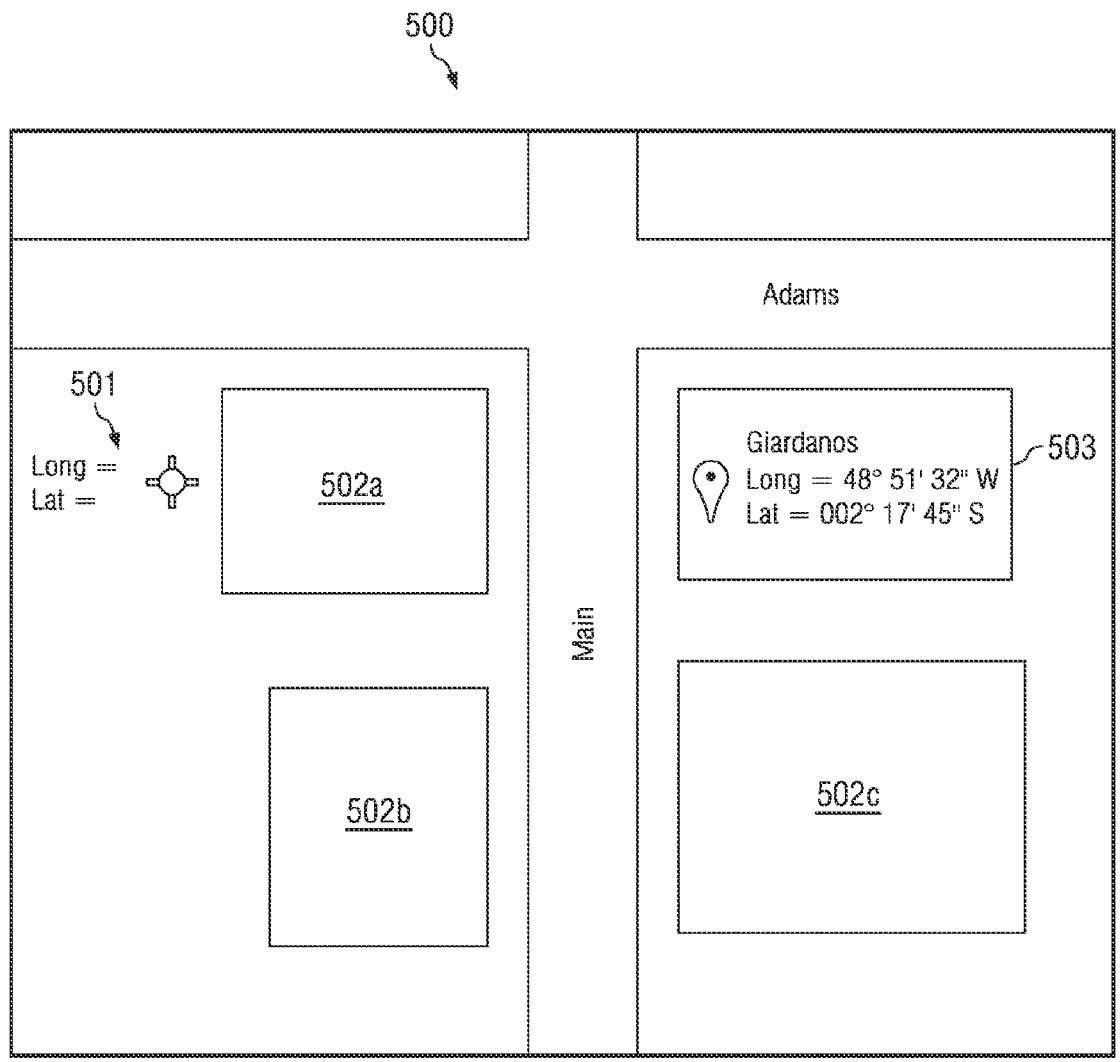
FIG. 5A illustrates another example location accuracy augmentation compensating for the urban canyon effect.
Figure 6:
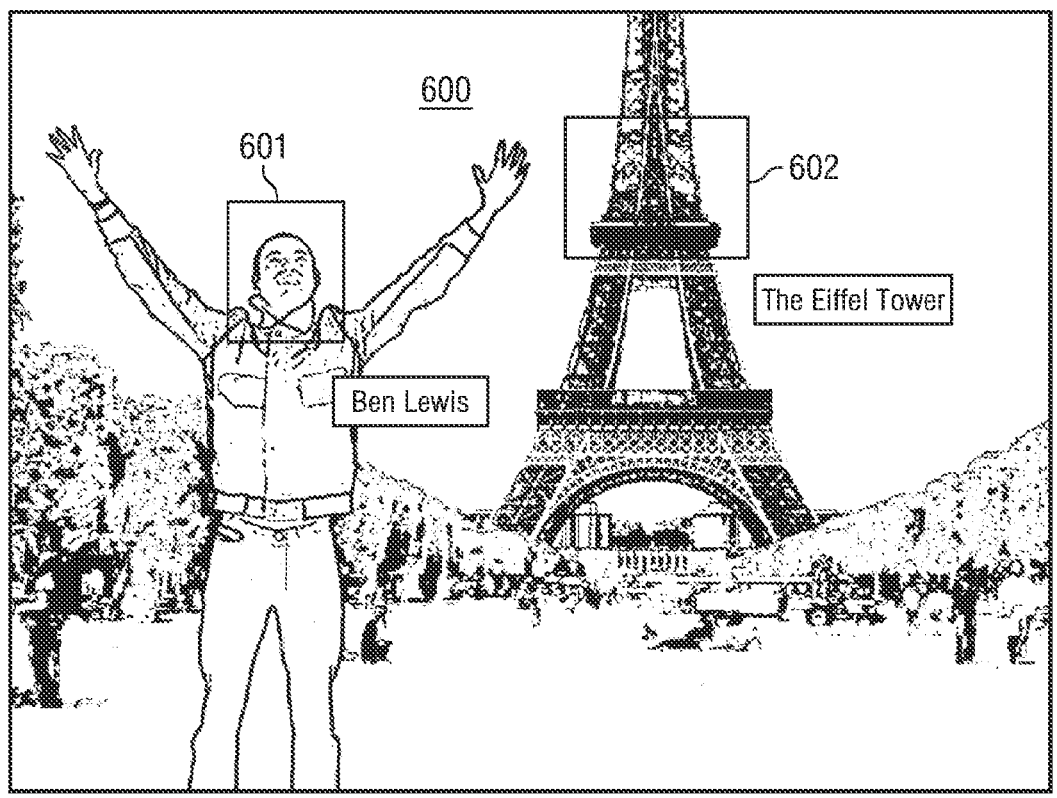
FIG. 6 illustrates an example of automatic object tagging in accordance with one embodiment of the invention.

Upon obtaining location information associated with one or more photographs in photographic location database 130 containing objects matching objects in the uploaded photo, location API 50 may take one or more actions utilizing the acquired location information. In Step 308a, location API may improve the location determination of client device 180. For example, if the user's client device 180 has performed a location-determining operation through GPS, aGPS, TDOA technologies, or if the user has self-declared a location explicitly, location API 50 may augment and increase the precision of client device 180's location determination. FIGS. 5 and 5A illustrate an example of this method. Additionally, location API 50 may check a user into a location in Step 308b. This method is depicted in FIG. 4. Finally, location API 50 may tag the detected object in Step 308c. This method is depicted in FIG. 6. Location API 50 may perform one or all of the actions in Step 308a-c upon obtaining the location information. U.S. patent application Ser. No. 12/858,718, filed Aug. 18, 2010, which is incorporated by reference herein, describes example methods of ranking a list of possible check-in places by various geo-social factors.

FIG. 4 depicts an example user check-in 400 generated or assisted by location API 50 in Step 308b. Check in 400 includes photo 401. In particular embodiments, photo 401 is the profile picture of the user performing the check-in, or a photo submitted in connection with a check-in workflow. In particular embodiments, photo 401 is all or a portion of scene 201 contained in the uploaded photo. Check in 400 also includes the name of the user checking in 402, and in particular embodiments, free-form text 405 the user may enter at the time of check-in. Location 403 is the location associated with one or more photos in photographic location database 130 containing the matching object. For example, if location API 50 detected objects matching the Eiffel Tower as shown in scene 201, the location "the Eiffel Tower, Paris, France" would be stored in association with the photos in which the matching object was found, and location API 50 would automatically generate a check-in for the user uploading the photo. In particular embodiments, location API 50 does not automatically generate a check-in, but assist in the check-in process. For example, when a user selects the "check-in" option on client device 180, instead of being required to type in his self-declared location, the Eiffel Tower is displayed at the top of the list of potential locations. For example, a location check-in query may contain one or more of free form text, a GPS-determined location and a photo. The location API 50 may process the photo to resolve one or more candidate locations and use these locations and the matched images to rank a list of places for potential check-in. In particular embodiments, location API 50 also includes face recognition application 50a that detects faces in scene 201, and attempts to match the faces to the user's first degree connections. In particular embodiments, the detected first-degree connections are automatically checked-in along with the user, as shown in 404. In particular embodiments, location API 50 does not automatically check-in the detected first degree connections, but rather assists the user in tagging friends (first degree connections). For example, when a user selects the "check-in" option on client device 180, instead of being required to type in other friends accompanying him, the names of the detected first-degree connections are immediately displayed at the top of the list of potential friends. Check-in 400 also includes the time 406 of the check-in, and an interactive space 407 where other users may comment or express affinity for check-in 400.

In particular embodiments, the location information may be used to narrow, order, or rank the locations displayed to a user manually manipulating a check-in GUI. When performing a manual check-in, social networking system 100 may receive a search request from a user. The search request may include a text string, location information from the user's client device 180, or a photograph. Upon receiving the search request, social networking system 100 may access location database 117 and return a list of potential places near the user's location. Additionally, in particular embodiments, the list may be ranked by relevance based upon the text string included in the search request. For example, if a user wants to check in to a nearby coffee shop, the user can type "coffe" in a web page or a client application with the search request. In particular embodiments, the list of places may be ranked based on social relevance. For example, social networking system 100 may access events database 113 using the user identifier in the check-in request to identify one or more friends of the user and, for each place, determines the check-in activity of the one or more friends at each place, and rank places in which friends of the user have previously checked into higher. In particular embodiments, the location information determined by location API is linked to a concept node in location database 117, such as a business or landmark, and that place is ranked higher in the list of places displayed to the user executing the check-in workflow. This disclosure contemplates any combination of location, social relevance, text, and photo-determined location for ranking and sorting the list of places to the user.

FIG. 5 depicts an example of the location-improving operation of Step 308*a*. Map 500 includes, for didactic purposes, client device 180's self-determined position 501 and a position represented by location information 502. Self-determined position 501 may be inaccurate for a number of reasons, for example, interference with GPS signals due to obstruction or solar flares, and inaccurate GPS signal fix due to temporal limitations. Particularly in feature phones lacking GPS receivers, position determination through cellular triangulation is highly inaccurate. In such cases, location API 50 may transmit location information 502 to client device 180 to improve its location accuracy for location-based services (LBS) such as search, navigation, or social networking. In particular embodiments, self-determined position 501 may be augmented by directionality values from location information 502. For example, if scene 201 may only be captured when facing southwest, location information 502 may include one or more direction vectors indicating a southwesterly direction. This direction information may augment self-determined position information 501 so that the user knows which way he or she is facing, obviating the need for a compass, or to travel in a given direction so that client device 180 may calculate his or her direction.

FIG. 5A depicts an example of the location-improving operation of Step 308*a* in an urban environment. The "urban canyon" problem is an artifact of an urban environment manifested by streets cutting through dense blocks of structures, particularly skyscrapers, which may adversely affect radio reception. The urban canyon effect particularly affects GPS signals, and may result in grossly inaccurate position determination from devices equipped with GPS and aGPS receivers. As depicted in FIG. 5A, map 500 includes client device 180's self-determined position 501, buildings 502*a*, 502*b*, and 502*c*, and location information 503 for a specific location, in this case "Giordano's Pizza." If, for example, location API 50 determines that the user has uploaded a picture of Giordano's Pizza through matching any number of objects or signage, position data 503 may be used to correct inaccurate position data 501. In dense urban environments, position data 503 may be significantly more accurate than self-determined position data 501; whereas GPS is generally accurate within 10 meters, position data 503 may indicate the precise location of the restaurant. In particular embodiments, location API may determine that the user could only be standing at a particular corner facing a particular direction to capture the uploaded photo, and the self-determined position data 501 may be corrected accordingly. Therefore, the location-improving mechanism of 308*a* may increase user location to enhance services such as search, navigation, and other location-based services.

FIG. 6 depicts an example of the auto-tagging function of Step 308*c*. Social networking system 100 may allow users to "tag" themselves or other users in photos. These tags are displayed as selectable boxes around the faces of individuals, that, when selected, direct a user to the tagged individual's profile page. Similarly, objects in photos may be tagged. When a user clicks on a tagged object, social networking system 100 automatically navigates the user to a hub page for the tagged object. FIG. 6 depicts a photo 600 with tagged individual 601 and tagged object 602. Social networking system 100 may automatically generate one or more user tags 601 through facial recognition application 50*a*. Similarly, when location API detects one or more objects matching objects in photos stored in photographic location database 130, location API 50 or, alternatively, social networking system 100 may automatically tag the detected object. For example, in this case, the object in scene 201 was matched by location API 50 with a number of photographs in photographic location database 130 associated with "The Eiffel Tower, Paris, France." Because the object has already been isolated by location API 50, social networking system 100 may simply place a bounding box around the object in scene 201 with a hyperlink to the hub page for "the Eiffel Tower."

Implementations of the foregoing provide a system that may automatically determine the location of a user capturing a multimedia object comprising a photograph or video file so that the location may be utilized to improve the self-determined position of the user's client device, automatically check the user in to the location, or automatically tag the object in the uploaded photo.

Figure 7:
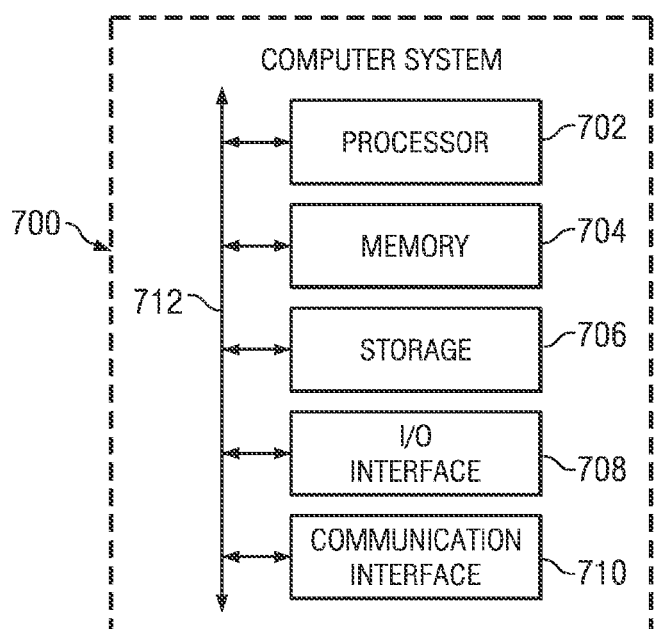
FIG. 7 illustrates an example computer system architecture.

FIG. 7 illustrates an example computer system 700, which may be used with some embodiments of the present invention. This disclosure contemplates any suitable number of computer systems 700. This disclosure contemplates computer system 700 taking any suitable physical form. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 706, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement. In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. The present disclosure contemplates processor 702 including any suitable number of any suitable internal caches, where appropriate.

In particular embodiments, memory 704 includes main memory for storing instructions for processor 702 to execute or data for processor 702 to operate on. One or more memory buses (which may each include an address bus and a data bus)

may couple processor 702 to memory 704. Although this disclosure describes and illustrates particular memory, this disclosure contemplates any suitable memory. In particular embodiments, storage 706 includes mass storage for data or instructions. This disclosure contemplates mass storage 706 taking any suitable physical form. Although this disclosure describes and illustrates particular storage, this disclosure contemplates any suitable storage. In particular embodiments, I/O interface 706 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. Although this disclosure describes and illustrates a particular I/O interface such as a touchscreen, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. Although this disclosure describes and illustrates a particular communication interface, this disclosure contemplates any suitable communication interface. In particular embodiments, bus 712 includes hardware, software, or both coupling components of computer system 700 to each other. Although this disclosure describes and illustrates a particular bus, this disclosure contemplates any suitable bus or interconnect.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages.

Figure 8:
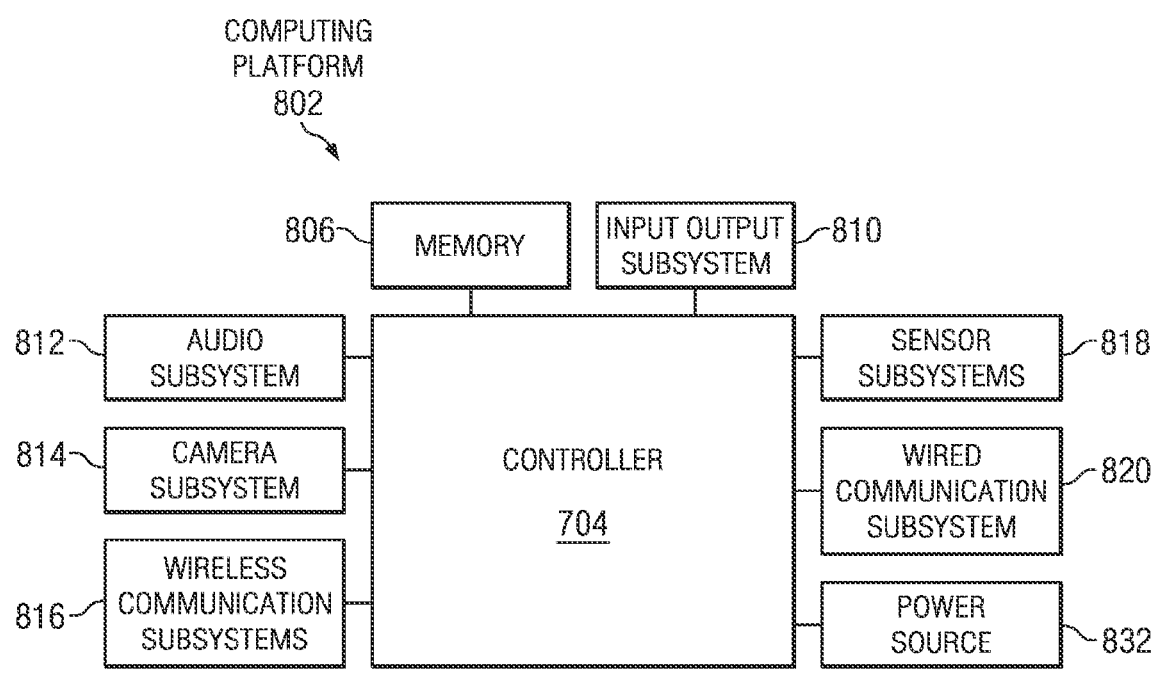
FIG. 8 illustrates an example mobile device.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 8 shows a schematic representation of the main components of an example computing platform 802, according to various particular embodiments. Multipoint sensing devices generally include a controller 804 which may comprise a microcontroller or one or more processors configured to execute instructions and to carry out operations associated with a computing platform. In various embodiments, controller 804 may be implemented as a single-chip, multiple chips and/or other electrical components including one or more integrated circuits and printed circuit boards. Controller 804 may optionally contain a cache memory unit for temporary local storage of instructions, data, or computer addresses. By way of example, using instructions retrieved from memory, controller 804 may control the reception and manipulation of input and output data between components of computing platform 802.

Controller 804 together with a suitable operating system may operate to execute instructions in the form of computer code and produce and use data. The operating system, other computer code (including control client 807 described below) and/or data may be physically stored within a memory block 806 that is operatively coupled to controller 804. Memory block 806 encompasses one or more storage media and generally provides a place to store computer code (e.g., software and/or firmware) and data that are used by the computing platform 802. Memory block 806 may also include one or more fixed storage devices in the form of, by way of example, solid-state hard disk drives (HDDs), among other suitable forms of memory coupled bi-directionally to controller 804. Information may also reside on a removable storage medium loaded into or installed in multipoint sensing devices when needed.

Controller 804 is also generally coupled to a variety of interfaces such as graphics control, video interface, input interface, output interface, and storage interface, and network interface, and these interfaces in turn are coupled to the appropriate devices. In certain embodiment, Controller 804 may connected to an input structure 814 and display 816 may be provided together, such an in the case of a touchscreen where a touch sensitive mechanism is provided in conjunction with the display 816. In such embodiments, the user may select or interact with displayed interface elements via the touch sensitive mechanism. In this way, the displayed interface may provide interactive functionality, allowing a user to navigate the displayed interface by touching the display 816.

Electric signals (e.g., analog) may be produced by microphone 810 and fed to earpiece 812. Controller 804 may receive instruction signals from input structure 814 and control the operation of display 816. By way of example, display 816 may incorporate liquid crystal display (LCD), light emitting diode (LED), Interferometric modulator display (IMOD), or any other suitable display technology. Audio signals may be transmitted and received by means of an antenna 817 that may be connected through a radio interface 820 or audio input interface such as microphone 824 to codec 822 configured to process signals under control of controller 804. Additionally, multipoint sensing devices may be powered power source 832.

Computing platform 802 may also include one or more user input devices 834 (other than input structure 814) that are operatively coupled to the controller 804. Generally, input devices 834 are configured to transfer data, commands and responses from the outside world into multipoint sensing devices. By way of example, mobile device may include a keyboard or mouse. Input devices 834 may also include one or more hard buttons.

Display device 816 is generally configured to display a graphical user interface (GUI) that provides an easy to use visual interface between a user of the computing platform 802 and the operating system or application(s) running on the mobile device. Generally, the GUI presents programs, files and operational options with graphical images. During operation, the user may select and activate various graphical images displayed on the display 816 in order to initiate functions and tasks associated therewith.

Herein, reference to a computer-readable storage medium encompasses one or more non-transitory, tangible computer-readable storage media possessing structure. Herein, reference to a computer-readable storage medium excludes any medium that is not eligible for patent protection under 35

U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computer systems:
   receiving, from a user, a multimedia object, the multimedia object comprising one or more images;
   applying one or more object image recognition algorithms to the multimedia object;
   comparing at least a portion of the multimedia object to a plurality of stored images in a database, each of the plurality of stored images associated with a physical location;
   determining a location of the user based on the comparison; and
   automatically associating the user with a concept node of a social graph representing a social network, the concept node being associated with the determined location.

2. The method of claim 1, further comprising automatically checking the user in to the determined location.

3. The method of claim 1, wherein the multimedia object is received in conjunction with a search request, and further comprising:
   ranking, based at least in part on the determined location, a list of places generated in response to the search request; and
   transmitting a response to the user including a ranked list of places.

4. The method of claim 3, wherein the search request comprises a user position, and the ranking based at least in part on the received user position.

5. The method of claim 1, wherein the multimedia object comprises an image.

6. The method of claim 1, wherein the multimedia object comprises a video, and wherein comparing at least a portion of the multimedia object comprises:
   extracting one or more frames from the video; and
   comparing the extracted one or more frames to the plurality of stored images in the database.

7. The method of claim 1, wherein the determined location comprises a longitude latitude coordinate pair.

8. The method of claim 1, wherein applying one or more object image recognition algorithms comprises:
   applying optical character recognition to extract text from the multimedia object;
   comparing the extracted text to a database of text entries, each of the plurality of entries associated with a location, and based on the comparison, narrowing the set of the plurality of stored images.

9. The method of claim 1, wherein the multimedia object is received from a mobile computing device with a camera.

10. The method of claim 9, wherein the mobile computing device lacks a global positioning system receiver.

11. The method of claim 1, further comprising automatically tagging an object associated with the determined location in the received multimedia object.

12. The method of claim 1, further comprising:
   applying a facial-recognition algorithm to the received image, and, for each of one or more detected faces:
   comparing, for each of the user's first-degree connections, the detected face to one or more photographs containing the face of the user's first degree connection.

13. The method of claim 12, further comprising:
   for each of the user's first-degree connections having one or more photographs matching one of the detected faces, automatically checking-in the detected first-degree connection to the determined location.

14. The method of claim 1, further comprising:
   receiving a character string;
   generating a list of the user's first-degree connections with user names matching the character string;
   applying a facial-recognition algorithm to the received image, and, for each of one or more detected faces:
   comparing, for each of the user's first-degree connections, the detected face to one or more photographs containing the face of the user's first degree connection;
   upon finding a match, increasing the rank of the detected first-degree connection; and
   transmitting the ranked list to the user.

15. A non-transitory, computer-readable media containing instructions that, when executed, cause a processor to:
   receive, from a user, a multimedia object, the multimedia object comprising one or more images;
   apply one or more object image recognition algorithms to the multimedia object;
   compare at least a portion of the multimedia object to a plurality of stored images in a database, each of the plurality of stored images associated with a physical location;
   determine a location of the user based on the comparison; and
   automatically associate the user with a concept node of a social graph representing a social network, the concept node being associated with the determined location.

16. The media of claim 15, further comprising instructions that, when executed, cause the processor to automatically check the user in to the determined location.

17. The media of claim 15, wherein the multimedia object comprises an image.

18. The media of claim 15, wherein applying one or more object image recognition algorithms comprises:
   applying optical character recognition to extract text from the multimedia object;
   comparing the extracted text to a database of text entries, each of the plurality of entries associated with a location, and
   based on the comparison, narrowing the plurality of stored images.

19. The media of claim 18, further comprising instructions that, when executed, cause the processor to:
   for each of the user's first-degree connections having one or more photographs matching one of the detected faces, automatically check-in the detected first-degree connection to the determined location.

20. The media of claim 15, further comprising instructions that, when executed, cause the processor to:
   receiving a character string;
   generating a list of the user's first-degree connections with user names matching the character string;
   applying a facial-recognition algorithm to the received image, and, for each of one or more detected faces:

comparing, for each of the user's first-degree connections, the detected face to one or more photographs containing the face of the user's first degree connection;
upon finding a match, increasing the rank of the detected first-degree connection; and
transmitting the ranked list to the user.

* * * * *